(12) United States Patent
Kondo et al.

(10) Patent No.: US 6,875,823 B2
(45) Date of Patent: Apr. 5, 2005

(54) PROCESS FOR PRODUCING MODIFIED POLYOLEFIN RESIN

(75) Inventors: Shinichi Kondo, Ichihara (JP); Takashi Sanada, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/635,470

(22) Filed: Aug. 7, 2003

(65) Prior Publication Data

US 2004/0198921 A1 Oct. 7, 2004

(30) Foreign Application Priority Data

Mar. 26, 2003 (JP) ........................................ 2003-085104

(51) Int. Cl.$^7$ ........................ C08F 255/00; C08F 255/02
(52) U.S. Cl. ........................ 525/387; 525/263; 525/264; 525/273; 525/277; 525/284; 525/285; 525/286
(58) Field of Search ............................... 525/263, 264, 525/273, 277, 284, 285, 286, 387

(56) References Cited

U.S. PATENT DOCUMENTS 6,569,950 B2 * 5/2003 Kitano et al. ............... 525/285

FOREIGN PATENT DOCUMENTS

| JP | 5-209025 A | 8/1993 |
|---|---|---|
| JP | 2001-122931 A | 5/2001 |

* cited by examiner

Primary Examiner—Roberto Rabago
(74) Attorney, Agent, or Firm—Sughrue Mion, PLLC

(57) ABSTRACT

There is provided a process for producing a modified polyolefin resin, which comprises the steps of:

(1) blending at least the following components (A) to (D) to produce a blend:
  (A) 100 parts by weight of a polyolefin resin,
  (B) from 0.1 to 20 parts by weight of a compound having an epoxy group and an unsaturated bond,
  (C) from 0.01 to 20 parts by weight of an organic peroxide having a decomposition temperature of from 50 to 115° C., at which temperature a half-life thereof is 1 minute, and
  (D) from 0 to 20 parts by weight of an organic peroxide having a decomposition temperature of from 150 to 200° C., at which temperature a half-life thereof is 1 minute, and (2) melt-kneading said blend to produce a modified polyolefin resin.

3 Claims, No Drawings

PROCESS FOR PRODUCING MODIFIED POLYOLEFIN RESIN

FIELD OF THE INVENTION

The present invention relates to a process for producing a modified polyolefin resin, wherein a molecular weight is hardly decreased, a graft amount is large and productivity is superior.

BACKGROUND OF THE INVENTION

A polyolefin resin has a problem that, for example, it has an insufficient adhesiveness, coating property and printing property with an inorganic material or a metal.

In order to solve said problem, there is generally known a method of melt-kneading in an extruder a polyolefin resin, an epoxy group-carrying derivative and a radical-generating compound.

However, said method has a limit for raising a graft amount, because adding a large amount of the radical-generating compound results in a remarkable change of a melt index (MI) of a melt-kneading product.

In order to solve said problem, there are known (1) a method of adding styrene ("Design of Practical Polymer Alloy", page 51, written by Fumio Ide and published by Kogyo Chosakai (1996)), and (2) a method of adding divinylbenzene (JP-A-7-173229). However, both of these methods do not give a satisfactory result.

SUMMARY OF THE INVENTION

An object of the present invention is to provide a process for producing a modified polyolefin resin, wherein a molecular weight is hardly decreased, a graft amount is large and productivity is superior.

The present inventors have undertaken extensive studies to accomplish the above-mentioned object, and as a result, have found that the above-mentioned object can be accomplished using a specific organic peroxide, and thereby the present invention has been obtained.

The present invention is a process for producing a modified polyolefin resin, which comprises the steps of:

(1) blending at least the following components (A) to (D) to produce a blend:

(A) 100 parts by weight of a polyolefin resin, (B) from 0.1 to 20 parts by weight of a compound having an epoxy group and an unsaturated bond, (C) from 0.01 to 20 parts by weight of an organic peroxide having a decomposition temperature of from 50 to 115° C., at which temperature a half-life thereof is 1 minute, and (D) from 0 to 20 parts by weight of an organic peroxide having a decomposition temperature of from 150 to 200° C., at which temperature a half-life thereof is 1 minute, and (2) melt-kneading said blend to produce a modified polyolefin resin.

DETAILED DESCRIPTION OF THE INVENTION

Examples of the polyolefin resin of the component (A) in the present invention are an ethylene polymer, a propylene polymer and a butene polymer.

Examples of the ethylene polymer are an ethylene homopolymer, an ethylene-propylene copolymer and an ethylene-α-olefin copolymer. Examples of the α-olefin are those having 4 to 20 carbon atoms such as 1-butene, 1-pentene, 1-hexene, 1-octene and 1-decene. Examples of the ethylene-α-olefin copolymer are an ethylene-1-butene copolymer, an ethylene-1-hexene copolymer and an ethylene-1-octene copolymer.

Examples of the propylene polymer are a propylene homopolymer; an ethylene-propylene random copolymer; a propylene-α-olefin random copolymer; an ethylene-propylene block copolymer; and a propylene-α-olefin block copolymer; and a blend of those polymers. Examples of the α-olefin are those mentioned above. Examples of the propylene-α-olefin random copolymer are a propylene-1-butene random copolymer and a propylene-1-butene block copolymer.

Examples of the compound of the component (B) in the present invention are glycidyl acrylate and glycidyl methacrylate. Among them, glycidyl methacrylate is preferable.

The component (B) is added in an amount of from 0.1 to 20 parts by weight, and preferably from 0.5 to 10 parts by weight per 100 parts by weight of the polyolefin resin. When said amount is less than 0.1 part by weight, a graft amount to the polyolefin resin is low. When said amount is more than 20 parts by weight, the obtained modified polyolefin resin contains much of the component (B2) remaining unreacted, and as a result, enough adhesive strength cannot be obtained for an adhesive use.

The component (C) in the present invention has a decomposition temperature of from 50 to 115° C., and preferably from 70 to 110° C., at which temperature a half-life thereof is 1 minute. When said decomposition temperature is lower than 50° C., a graft amount is low, and when said decomposition temperature is higher than 115° C., a stable production cannot be carried out. A preferable component (C) is those, which decompose to generate a radical, and then abstract a proton from the polyolefin resin.

Examples of the component (C) are diacyl peroxide compounds; percarbonate compounds (I) having the following structure (1) in its molecule; and alkyl perester compounds (II) having the following structure (2) in its molecule. Among them, percarbonate compounds (I) are preferable in view of the above-mentioned proton-abstracting function.

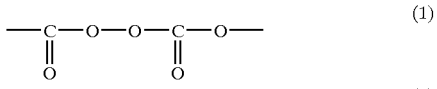

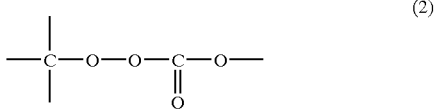

Examples of the above-mentioned percarbonate compounds (I) are dicetyl peroxydicarbonate, di-3-methoxybutyl peroxydicarbonate, di-2-ethylhexyl peroxydicarbonate, bis(4-t-butylcyclohexyl) peroxydicarbonate, diisopropyl peroxydicarbonate, t-butyl peroxyisopropylcarbonate and dimyristyl peroxycarbonate.

Examples of the above-mentioned alkyl perester compounds (II) are 1,1,3,3-tetramethylbutyl neodecanoate, α-cumyl peroxyneodecanoate and t-butyl peroxyneodecanoate.

The organic peroxide of component (C) is added in amount of from 0.01 to 20 parts by weight, and preferably from 0.05 to 10 parts by weight per 100 parts by weight of the polyolefin resin. When said amount is less than 0.01 part by weight, a graft amount to the polyolefin resin is low. When said amount is more than 20 parts by weight, decomposition of the polyolefin resin is promoted.

The component (D) in the present invention has a decomposition temperature of from 150 to 200° C., and preferably from 160 to 195° C., at which temperature a half-life thereof is 1 minute. When said decomposition temperature is lower than 150° C., or higher than 200° C., a graft amount is low.

Examples of the component (D) are 1,1-bis(t-butylperoxy)cyclohexane, 2,2-bis(4,4-di-t-butylperoxycyclohexyl)propane, 1,1-bis(t-butylperoxy)cyclododecane, t-hexylperoxyisopropyl monocarbonate, t-butylperoxy-3,5,5-trimethyl haxonoate, t-butylperoxylaurate, 2,5-dimethyl-2,5-di(bezoylperoxy)hexane, t-butylperoxyacetate, 2,2-bis(t-butylperoxy)butene, t-butylperoxybenzoate, n-butyl-4,4-bis(t-peroxy)valerate, di-t-butylperoxyisophthalate, dicumylperoxide, α-α'-bis(t-butylperoxy-m-isopropyl)benzene, 2,5-dimethyl-2,5-di(t-butylperoxy)hexane, 1,3-bis(t-butylperoxyisopropyl)benzene, t-butylcumylperoxide, di-t-butylperoxide, p-menthane hydroperoxide and 2,5-dimethyl-2,5-di(t-butylperoxy)hexyne-3.

The organic peroxide of component (D) is added in amount of from 0 to 20 parts by weight, and preferably from 0 to 10 part by weight per 100 parts by weight of the polyolefin resin. When said amount is more than 20 parts by weight, decomposition of the polyolefin resin is promoted.

Respective components in the present invention can be combined with an electron donor compound such as styrene and divinylbenzene, or additives known in the art such as antioxidants, heat stabilizers and neutralizers generally added to a polyolefin resin.

In the present invention, a method for producing the blend and a method of melt-kneading the blend may be those known in the art. A preferable method comprises the steps of (1) blending all of respective components in a lump, or separately in combination of some of them, in a blending apparatus such as a Henschel mixer, a ribbon blender and a blender to produce a homogeneous blend, and then (2) melt-kneading the blend.

Examples of an apparatus for melt-kneading are those known in the art such as a Banbury mixer, a plastomil, a Brabender plastograph, a single-screw extruder and a twin-screw extruder. The single-screw or twin-screw extruder is particularly preferable in view of continuous production (namely, productivity).

Temperature in a melt-kneading zone of the kneading apparatus is generally from 50 to 300° C., and preferably from 100 to 250° C. When said temperature is lower than 50° C., a graft amount may be low, and when it is higher than 300° C., the polyolefin resin may decompose. A preferable extruder has a former melt-kneading zone and a latter melt-kneading zone, wherein temperature in the latter melt-kneading zone is higher than that in the former melt-kneading zone. A melt-kneading period of time is from 0.1 to 30 minutes, and particularly preferably from 0.5 to 5 minutes. When said period of time is shorter than 0.1 minute, a graft amount may be insufficient, and when it is longer than 30 minutes, the polyolefin resin may decompose.

EXAMPLE

The present invention is explained with reference to the following Examples, which do not limit the scope of the present invention.

The following evaluation methods were used.
1. Production stability

It was evaluated when producing a sample for evaluation, according to the following criteria:

(1) ○, which means that a strand can be drawn stably, and (2) X, which means that a strand cuts easily, and as a result, it cannot be drawn stably.

2. Melt Index (g/10 min.)

It was measured according to JIS K7210 under 230° C. and a load of 21.2 N.

Example 1

To 100 parts by weight of a propylene homopolymer (A-1) having a melt index of 0.5 g/10 min., 3.0 parts by weight of glycidyl methacrylate (B), 0.50 part by weight of dicetyl peroxydicarbonate (C), 0.15 part by weight of 1,3-bis(t-butylperoxyisopropyl)benzene (D), 3.0 parts by weight of styrene (E), 0.05 part by weight of calcium stearate, and 0.3 part by weight of tetraxis[methylene-3-(3,5-di-t-butyl-4-hydroxyphenyl)propionate]methane (as an antioxidant) were added. The obtained mixture was blended thoroughly to obtain a blend. Said blend was melt-kneaded in a twin-screw extruder (L/D=25, a cylinder diameter=20 mm), Type 2D25-S, manufactured by Toyo Seiki Co., Ltd. under conditions of a screw rotating speed of 70 rpm, temperature in the former melt-kneading zone of 180° C., and that in the latter melt-kneading zone of 260° C., thereby obtaining a modified polyolefin resin.

A graft amount of maleic acid contained in said modified polyolefin resin was measured according to a method comprising the steps of:

(1) dissolving 1.0 gram of said resin in 20 ml of xylene to obtain a solution, (2) dropping the solution into 300 ml of methanol under stirring to re-precipitate the resin, (3) separating the re-precipitated resin by filtration, (4) drying the separated resin in vacuo at 80° C. for 8 hours, (5) hot-pressing the dried resin to obtain a film having a thickness of 100 μm, (6) measuring an infrared absorption spectrum of the film, and (7) determining an amount of grafted maleic acid (% by weight; a total amount of the resin is assigned to be 100% by weight) from the absorption near 1780 cm$^{-1}$.

Results are shown in Table 1.

Example 2

Example 1 was repeated to obtain a modified polyolefin resin, except that the polymer (A-1) was changed to an ethylene-propylene block copolymer (A-2) having MI of 0.4 g/10 min. Results are shown in Table 1.

Example 3

Example 1 was repeated to obtain a modified polyolefin resin, except that the organic peroxide (D) was not used. Results are shown in Table 1.

Comparative Example 1

Example 1 was repeated, except that the organic peroxide (C) was not used. Results are shown in Table 1.

TABLE 1

|  | Example | | | Comparative |
| --- | --- | --- | --- | --- |
|  | 1 | 2 | 3 | Example 1 |
| Blending (part by weight) | | | | |
| (A-1) Propylene polymer | 100 |  | 100 | 100 |
| (A-2) Propylene polymer |  | 100 |  |  |
| (B) Glycidyl methacrylate | 3.0 | 3.0 | 3.0 | 3.0 |

TABLE 1-continued

| | Example | | | Comparative |
|---|---|---|---|---|
| | 1 | 2 | 3 | Example 1 |
| (C) Organic peroxide*1 | 0.50 | 0.50 | 0.50 | |
| (D) Organic peroxide*2 | 0.15 | 0.15 | | 0.15 |
| (E) Styrene | 3.0 | 3.0 | 3.0 | 3.0 |
| Evaluation | | | | |
| Production stability | ○ | ○ | ○ | X |
| MI (g/10 min.) | 2.8 | 0.4 | 0.4 | 3.7 |
| Grafted amount (% by weight) | 1.08 | 1.16 | 0.93 | 0.48 |

*1Dicetyl peroxydicarbonate containing an active oxygen in an amount of 2.8%, whose decomposition temperature having a half-life of 1 minute is 99° C.
*2 1,3-bis(tert-butyl peroxyisopropyl)benzene containing an active oxygen in an amount of 9.3%, whose decomposition temperature having a half-life of 1 minute is 183° C.

As explained above, in accordance with the present invention, there can be provided a process for producing a modified polyolefin resin, wherein a molecular weight is hardly decreased, a graft amount is large and productivity is superior.

What is claimed is:

1. A process for producing a modified polyolefin resin, which comprises the steps of:
    (1) blending at least the following components (A) to (D) to produce a blend:
        (A) 100 parts by weight of a polyolefin resin,
        (B) from 0.1 to 20 parts by weight of a compound having an epoxy group and an unsaturated bond,
        (C) from 0.01 to 20 parts by weight of an organic peroxide having a decomposition temperature of from 50 to 115° C., at which temperature a half-life thereof is 1 minute, and
        (D) from 0 to 20 parts by weight of an organic peroxide having a decomposition temperature of from 150 to 200° C., at which temperature a half-life thereof is 1 minute, and
    (2) melt-kneading said blend to produce a modified polyolefin resins,
    wherein said melt-kneading is carried out in an extruder having a former melt-kneading zone and a latter melt-kneading zone, the temperature in the latter melt-kneading zone being higher than that in the former melt-kneading zone.

2. The process for producing a modified polyolefin resin according to claim 1, wherein the component (C) contains an organic peroxide having the following structure (1):

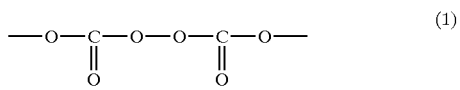

in its molecule.

3. The process for producing a modified polyolefin resin according to claim 1, wherein the blend further contains styrene.

* * * * *